Oct. 15, 1957  H. J. WADDELL  2,809,522
DIAPHRAGM ASSEMBLY FOR GAS METERS
Filed Nov. 12, 1954
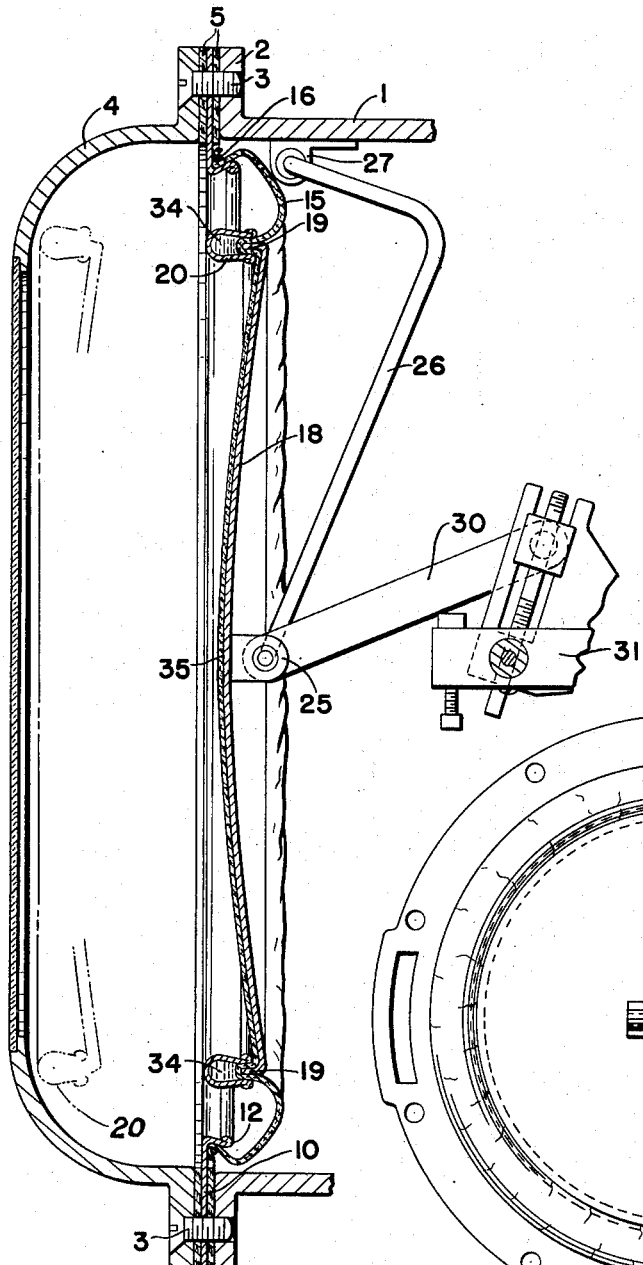
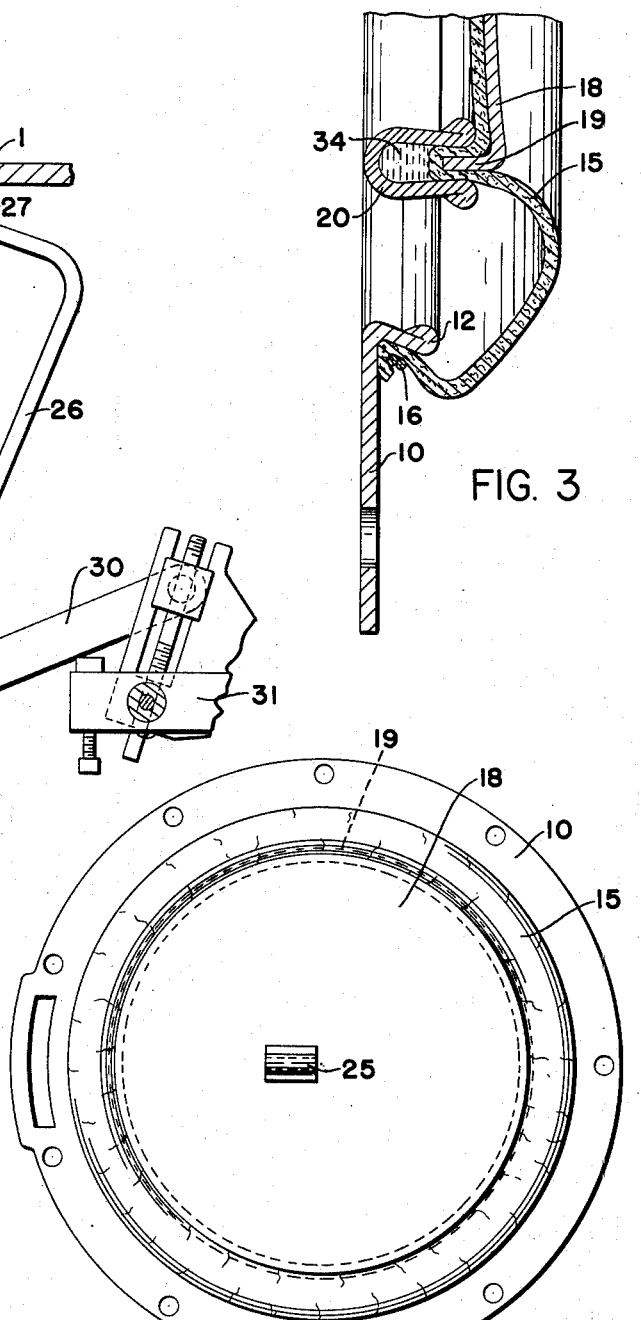
FIG. 1  FIG. 2  FIG. 3
INVENTOR.
HOMER J. WADDELL
BY Ely, Frye & Hamilton
ATTORNEYS

United States Patent Office 2,809,522
Patented Oct. 15, 1957

2,809,522

DIAPHRAGM ASSEMBLY FOR GAS METERS

Homer J. Waddell, Baltimore, Ohio, assignor to Waddell Incorporated, Baltimore, Ohio, a corporation of Ohio Application November 12, 1954, Serial No. 468,317

7 Claims. (Cl. 73—280)

The present invention has for its object the improvement of flexible diaphragm assemblies such as are used in gas meters. The type of gas meter to which the invention is adapted is that type of meter shown in Sprague Patent No. 1,892,520, December 27, 1932, and in Waddell Patent No. 1,788,754, January 13, 1931.

Meters of the type specified are characterized by the provision of a casing in opposite sides of which are located gas chambers, the inner opposed walls of which are formed by flexible diaphragms. These diaphragms are usually formed of soft flexible leather, although neoprene and other non-permeable, flexible sheetings have been substituted for leather. The outer edge of the diaphragm is fastened to the body of the casing and on the center of the diaphragm is mounted a rigid disk to which is attached an arm. This arm is connected to the crankshaft which operates the dials by which the flow of gas is measured and recorded.

The diaphragm is so mounted in the meter that a very considerable fullness exists in that part of the diaphragm between the outer casing and the inner disk.

One of the objects of the invention is to provide a novel mode of attaching the disk to the central area of the diaphragm and to the dial operating mechanism, so that no apertures are formed in the diaphragm and it extends as a continuous, impervious and imperforate sheet over the entire extent of the space across the casing. In all previous constructions of this type with which I am familiar, the diaphragm is fastened to the meter operating mechanism by bolts or plates or rivets which afford apertures through which gas may leak from the gas holding chambers.

It is also an object of the invention to provide for permanent lubrication of the diaphragm. Soft, flexible leather is preferred as the material for the diaphragm, but leather will lose it flexibility in time and it is desirable to preserve it by lubrication. Leather is usually lubricated with an oil dressing before it is inserted in the meter and attempts have been made to keep the leather lubricated by injecting oil in the meter, but these expedients are not satisfactory.

It is one of the objects of the invention to provide a permanent supply of lubricant for the diaphragm and the construction shown herein will accomplish this purpose while providing for the imperforate diaphragm. In this respect, the present application is in the nature of an improvement upon applicant's prior application Serial No. 434,509, filed June 4, 1954.

The recited objects have been obtained by the novel construction of the diaphragm as will be described in detail, it being understood that exact adherence to details of construction is not necessary to accomplish the unique results of the invention. Hence, changes and modifications may be made within the scope of the invention as set forth in the claims appended hereto. It will be further understood that the invention is not necessarily limited to the form of meter shown, but may be used on other meters in which there are pulsating diaphragms.

In the drawings, in which the preferred form of the invention is shown:

Fig. 1 is a cross section through one side of a standard meter of the type to which this invention is especially, although not necessarily, adapted.

Fig. 2 is a front view of a complete diaphragm with its attachments, removed from the casing.

Fig. 3 is an enlarged section taken at the points of attachment of the diaphragm to the outer ring and the inner disk.

In the drawings, 1 represents one side of the main body of a standard form of meter which has been selected as the means for employing the new and improved diaphragm. This has a flange 2 to which is attached, by screws 3, the outer cover plate 4 which forms the outer fixed wall of the gas chamber on that side of the meter.

The diaphragm assembly consists of an outer ring 10, the body of which is located between the flange 2 and the part 4 and is held in position by the bolts 3. Packing gaskets 5 seal the spaces on either side of the ring 10. The inner edge of the ring 10 is provided with a flange 12 about which the edge of the diaphragm proper 15 is fitted, being held in position by the wrappings 16.

As stated above, the preferred material for the diaphragm proper is leather, although the invention in certain of its aspects is not confined to that material. The leather diaphragm is shaped and worked so that it acquires a considerable fullness, which is illustrated in the drawings and which provides for the pulsation of the diaphragm as it moves in and out of the chamber during the flow of gas through the meter. In order to maintain this flexibility so that the meter will function indefinitely, a permanent supply of lubricant is provided for, as will be described.

Lying over the central area of the diaphragm and on the inner surface thereof is the rigid central disk 18 to which the operative parts of the meter are attached. This disk has a peripheral flange 19, over which is crimped the continuous clamping channel or ring 20. In assembling the diaphragm, the central area thereof is stretched tightly over the central portion of the disk 18 and the ring 20 is forced into place over the flange 19 and crimped so as to hold the diaphragm firmly between the flange 19 and the ring 20. This forms a novel means of attaching the central disk to the diaphragm without puncturing the diaphragm or otherwise destroying its complete impermeable continuity.

To attach the meter operating mechanism to the diaphragm, a lug 25 welded or brazed to the inner face of the diaphragm, and through this lug is passed the horizontal arm of a bent rod 26, the other end of which is pivoted to a lug 27 on the inside of the casing 1. This supports the diaphragm in its pulsating movement. To the inner end of the rod 26 is pivoted the link 30 which operates the standard dial operating crank mechanism indicated by the numeral 31.

In order to supply the permanent lubricant, the ring 20 may be somewhat deeper than is required to merely hold the disk 18 and the diaphragm 15 together, and in the space thus provided may be placed a supply of lubricant 34 which will seep into the leather and keep it soft and flexible indefinitely. In addition, a layer of the lubricant 35 may be spread over the disk 18 before the leather is shaped and clamped thereon. Compositions for suitable lubricant are well known, of which a combination of neat's-foot oil, petrolatum and sperm oil is an example. The lubricant should be applied to the skin side of the leather so that it will be more readily absorbed.

As shown in Fig. 1, the disk 18 should preferably be offset or bowed toward the outer face of the meter. This may be done on an arc as shown or the disk may be conical. The purpose of this feature is to prevent the ring 20 from contacting the inner wall of the cover plate 4 when the diaphragm is at the outer limit of its stroke, as shown in dotted lines in Fig. 1. In this way the dial operating mechanism is assured of completing a full stroke. If desired, a flat area 35 may be provided at the center of the disk to afford a land to which the lug 25 may be attached.

It will be seen that a diaphragm assembly has been provided by which the operating mechanism may be secured thereto without perforating the diaphragm, and thereby there is insured a gas-tight diaphragm at all times. In addition, the diaphragm is permanently lubricated and will retain its softness and flexibility indefinitely. The construction of the improved diaphragm makes the job of installing the diaphragm much easier and quicker than is the case with earlier forms of diaphragms.

It will be seen that certain phases of the invention are not limited to the use of leather as the material of the diaphragm. Neoprene, butyl rubber, or other synthetic rubbers which are notable for their impermeability to gases are suitable for the diaphragm. The diaphragm per se may be sold independently of the meter.

What is claimed is:

1. A diaphragm for use in gas meters comprising an outer ring, a flexible impervious and imperforate diaphragm attached at its edge to said ring, a rigid disk located at the center of said diaphragm, said diaphragm being folded over the edge of the disk, and channel shaped crimping means fitted over the edge of the disk and the fold in the diaphragm to embrace and hold the diaphragm on the disk.

2. A diaphragm for use in gas meters comprising an outer ring, a flexible impervious and imperforate diaphragm attached at its edge to said ring, a rigid disk located at the center of said diaphragm, said diaphragm being folded over the edge of the disk, and a channel shaped crimping ring fitted over the edge of the disk and the fold in the diaphragm for embracing and holding the diaphragm and the disk.

3. A diaphragm for use in gas meters comprising an outer ring, a flexible impervious and imperforate diaphragm attached at its edge to said ring, a rigid disk located at the center of said diaphragm and spaced from the ring to provide a bellows area between the ring and the disk, said diaphragm being folded over the edge of the disk, channel shaped crimping means to embrace the fold in the diaphragm and the edge of the disk and hold the diaphragm on the disk, and a body of lubricant held in the crimping means.

4. A diaphragm for use in gas meters comprising an outer ring, a flexible impervious diaphragm attached at its edge to said ring, a rigid disk located at the center of the diaphragm and spaced from the ring to provide a bellows area between the ring and the disk, said disk having an inturned flange on its periphery, the diaphragm being folded over the flange and a crimping ring, the arms of which embrace the flange and the material of the diaphragm and hold the disk on the diaphragm.

5. A diaphragm as described in claim 4 in which the crimping ring is provided with a channel which holds a supply of lubricant for the diaphragm.

6. A diaphragm for use in gas meters comprising an outer ring, a flexible impervious diaphragm attached at its edge to the ring, said diaphragm extending over the entire opening in the ring, that portion of the diaphragm which is located in the opening being imperforate throughout, a rigid disk of lesser diameter than the inner diameter of the ring located at the center of the diaphragm, and means attaching the disk to the diaphragm comprising a fold in the diaphragm adjacent to and conforming in outline to the periphery of the disk and a channel also of outline conforming to the periphery of the disk in which the fold is received and held clamped to the disk by the contractile force exerted by the walls of the channel.

7. A diaphragm for use in gas meters comprising an outer ring, a flexible impervious diaphragm attached at its edge to the ring, said diaphragm extending over the entire opening in the ring, that portion of the diaphragm which is located in the opening being imperforate throughout, a rigid disk of lesser diameter than the inner diameter of the ring overlying the central portion of the diaphragm, attaching means for the dial operating mechanism attached to the disk on the side thereof opposite the diaphragm, and means to attach the disk to the diaphragm comprising an annular fold in the diaphragm adjacent the edge of the disk and a channel conforming to and adjacent the edge of the disk in which the fold is received and held by the contractile force exerted by the walls of the channel.

References Cited in the file of this patent

UNITED STATES PATENTS

| | | |
|---|---|---|
| 565,208 | Holdship | Aug. 4, 1896 |
| 565,209 | Holdship | Aug. 4, 1896 |
| 1,036,233 | Heeley | Aug. 20, 1912 |
| 1,238,463 | Krusenstjerna | Aug. 28, 1917 |
| 2,544,665 | Gilmore | Mar. 13, 1951 |

FOREIGN PATENTS

| | | |
|---|---|---|
| 239,641 | Great Britain | Sept. 17, 1926 |